UNITED STATES PATENT OFFICE.

HENRY A. TILDEN, OF NEW LEBANON, NEW YORK.

IMPROVEMENT IN MEDICAL COMPOUNDS.

Specification forming part of Letters Patent No. 129,626, dated July 16, 1872.

*To all whom it may concern:*

Be it known that I, HENRY A. TILDEN, of the town of New Lebanon, county of Columbia and State of New York, have invented a new and useful Chemical Compound; and the following is declared to be a correct description of the same.

Said chemical compound is intended for medicinal use as an aperient, alterative, antiseptic, resolvent, tonic, and other medicinal purposes; and the following is declared to be a correct description thereof: My compound is made with bromine, iodine, chlorine, calcium, and magnesium. Sodium, potassium, and iron may be added. Said compound is prepared by the action of iodide and bromide of iron upon the oxide of calcium and magnesium or their carbonates, thereby producing iodide and bromide of calcium and magnesium and oxide or carbonate of iron, which is separated by precipitation. The iodide and bromide thus produced are combined with chloride of calcium to the proportion of eight parts of chloride, four parts bromide, two parts iodide of calcium, one part each iodide and bromide of magnesium, and is based upon certain reciprocal chemical actions, and combining chemical equivalents. It may be produced by direct combination of the several salts, or indirectly or successively by decomposition from any salts containing the elements of the same; or from any resulting waste products or waters in chemical or industrial works; or from any natural waters that may contain either bromine, iodine, chlorine, or the salts of the same.

I prefer to make said chemical compound up in the form of a solution, usually of the S. G. 1.355; but it may be in the form of a salt, and combined with some inert substance to prevent deliquescence; or with salts of potassium, sodium, or iron; or, when in the form of solution, may be charged with carbonic-acid gas, or combined with a sirup or elixir, or fluid extract; but I do not limit myself to their use, nor to the precise proportion of the iodide, bromide, or chloride salts stated.

What I claim as my invention is—

The compound herein specified, prepared and employed substantially as and for the purposes set forth.

Signed by me this 15th day of June, A. D. 1872.

HENRY A. TILDEN.

Witnesses:
GEO. T. PINCKNEY,
CHAS. H. SMITH.